US012101617B2

(12) United States Patent
Zhang

(10) Patent No.: US 12,101,617 B2
(45) Date of Patent: Sep. 24, 2024

(54) LOUDSPEAKER WITH A FIN-REINFORCED VOICE COIL STRUCTURE

(71) Applicant: HAINING XIMINI TECHNOLOGY CO., LTD., Zhejiang (CN)

(72) Inventor: Wei Zhang, Zhejiang (CN)

(73) Assignee: HAINING XIMINI TECHNOLOGY CO., LTD., Zhejiang (CN)

( * ) Notice: Subject to any disclaimer, the term of this patent is extended or adjusted under 35 U.S.C. 154(b) by 336 days.

(21) Appl. No.: 17/623,606

(22) PCT Filed: Aug. 31, 2020

(86) PCT No.: PCT/CN2020/112614
§ 371 (c)(1),
(2) Date: Oct. 4, 2022

(87) PCT Pub. No.: WO2021/047410
PCT Pub. Date: Mar. 18, 2021

(65) Prior Publication Data

US 2023/0019916 A1 Jan. 19, 2023

(30) Foreign Application Priority Data

Sep. 11, 2019 (CN) ........................ 201910861182.4

(51) Int. Cl.
*H04R 9/06* (2006.01)
*H04R 9/02* (2006.01)
*H04R 9/04* (2006.01)

(52) U.S. Cl.
CPC ............ *H04R 9/046* (2013.01); *H04R 9/025* (2013.01); *H04R 9/027* (2013.01); *H04R 9/041* (2013.01);
(Continued)

(58) Field of Classification Search
CPC ........ H04R 9/025; H04R 9/027; H04R 9/041; H04R 9/045; H04R 9/046; H04R 9/06; H04R 2209/024; H04R 2209/041
See application file for complete search history.

(56) References Cited

U.S. PATENT DOCUMENTS 5,664,024 A * 9/1997 Furuta .................... H04R 7/127 381/396
5,734,734 A * 3/1998 Proni ....................... H04R 9/02 381/432

(Continued)

FOREIGN PATENT DOCUMENTS

CN 201699967 U 1/2011
CN 201750544 U 2/2011

(Continued)

*Primary Examiner* — Huyen D Le
(74) *Attorney, Agent, or Firm* — Jeenam Park

(57) ABSTRACT

The invention provides a loudspeaker with a fin-reinforced voice coil structure, comprising a voice coil, fins, an upper magnetic conductor, and a magnetic conduction column, wherein a magnetic gap is formed between the upper magnetic conductor and the magnetic conduction column located in the center thereof; the voice coil works in the magnetic gap; wherein the inner wall of the voice coil is connected to the fins; wherein one end of each fin is connected and fixed to the inner wall of the voice coil; wherein the magnetic conduction column is provided with fin grooves for accommodating the other ends of the fins; wherein the width of the fin grooves is at least 0.2 mm greater than the thickness of the fins, so that the balance performance and the stability of the voice coil are greatly improved. The distortion is greatly reduced compared, by measurement, with the traditional voice coil.

10 Claims, 7 Drawing Sheets

(52) U.S. Cl.
CPC ............... *H04R 9/045* (2013.01); *H04R 9/06* (2013.01); *H04R 2209/024* (2013.01); *H04R 2209/041* (2013.01)

(56) References Cited

U.S. PATENT DOCUMENTS

| | | | | |
|---|---|---|---|---|
| 6,594,372 | B2 * | 7/2003 | Nakaso .................... | H04R 9/04 381/409 |
| 2009/0257617 | A1 | 10/2009 | Ikeda et al. | |

FOREIGN PATENT DOCUMENTS

| | | | |
|---|---|---|---|
| CN | 209120468 | | 7/2019 |
| CN | 110557702 | A | 12/2019 |
| CN | 210075576 | A | 2/2020 |
| KR | 100751862 | B1 | 8/2007 |

* cited by examiner

LOUDSPEAKER WITH A FIN-REINFORCED VOICE COIL STRUCTURE

BACKGROUND OF THE INVENTION

1. Field of the Invention

The invention belongs to the technical field of loudspeakers, and in particular relates to a loudspeaker with a fin-enhanced voice coil structure.

2. Description of the Related Art

When the loudspeaker is working, the vibration frequency corresponding to the sound of different wavelengths is extremely high, and it is impossible to observe it visually. It needs to use a laser vibrometer and other equipment to observe. It can be observed by using a professional vibrometer that the diaphragm and voice coil of the vibration sound system of the loudspeaker are constantly distorted and divided vibrations under working conditions. These are important sources of loudspeaker distortion. Acoustician have done a lot of work on the improvement of diaphragm and obtained many excellent results, but the research on the voice coil is relatively lagging behind. The smaller the magnetic gap distance, the greater the magnetic flux, and the higher the loudspeaker efficiency. Therefore, modern loudspeakers have very small magnetic gaps close to the voice coil. When the voice coil is deformed at high speed, it always touches and rubs with the magnetic conduction column and the magnetic conduction plate. These frictions make the electric signal unable to be faithfully restored and the loudspeaker is distorted. Some research results make the voice coil with micro-magnetism to make the voice coil fixed in the middle position by the magnetic force in the magnetic field without touching the magnetic conduction plates on both sides. However, this is only the effect that can be obtained when the voice coil is at rest. When the voice coil is working in the state of high speed and deformation, the friction will always exist. In addition, the voice coil is in a high temperature heating state during long-term operation. At this time, the stiffness of the voice coil decreases significantly and the deformation becomes more severe. Open the loudspeaker used for a period of time, and the magnetic conduction column in it has obvious scratches.

It is not easy to improve the distortion performance of the loudspeaker. Although the current voice coil drive method has the advantages of low cost and easy production, the eccentric vibration of the entire loudspeaker vibration system has not been solved. The previous research direction has been the improvement of the spider, and many remarkable results have been obtained, such as dual spider, unequal-distance linear spider, A-shaped spider, etc. However, the deformation of the voice coil itself has not been resolved.

At the same time, this invention also conveniently realizes dual voice coil drive. Previous inventions mentioned that multiple voice coils independently drive the same diaphragm. Due to the subtle differences in magnetic fields and coils, they are not synchronized during operation. Two or more non-synchronized voice coils drive the same loudspeaker diaphragm, resulting in higher distortion rate than that driving by single voice coil. There are some patents for dual voice coil. The permanent magnet of the dual voice coil is surrounded by movable voice coil, suspended between the magnetic conductor and the voice coil. There is no place to fix it, and it is not manufacturable.

SUMMARY OF THE INVENTION

The technical problem to be solved by the invention is to overcome the existing defects and provide a loudspeaker with a fin-reinforced voice coil structure. The balance performance and the stability of the voice coil are greatly improved, and the distortion is greatly reduced compared, by measurement, with the traditional voice coil.

In order to achieve the above objectives, the invention provides the following technical solutions: loudspeaker with a fin-reinforced voice coil structure comprises a voice coil, fins, an upper magnetic conductor, and a magnetic conduction column, characterized in that: a magnetic gap is formed between the upper magnetic conductor and the magnetic conduction column located in the center thereof. The voice coil works in the magnetic gap; wherein the inner wall of the voice coil is connected to the fins. One end of each fin is connected and fixed to the inner wall of the voice coil (Fixed on the inner wall of the voice coil to form inner fins, fixed on the outer wall of the voice coil to form outer fin, and both of them can achieve the technical effects of the invention). The magnetic conduction column is provided with fin grooves for accommodating the other ends of the fins. The width of each fin groove is at least 0.2 mm greater than the thickness of the fin. The depth of each fin groove must be greater than or equal to the linear stroke set by the loudspeaker. The height of the fins is less than or equal to the height of the voice coil.

Preferably, the voice coil includes an inner voice coil and an outer voice coil to form a finned double voice coil. The outer voice coil and the inner voice coil are both in the shape of a hollow barrel. The outer voice coil and the inner voice coil are both wound with a conductive coil, and the outer layer of the conductive coil is provided with insulating material. The magnetic conduction column is the first upper magnetic conductor. The upper magnetic conductor is an annular third upper magnetic conductor.

Preferably, below the first upper magnetic conductor are a second cylindrical radial permanent magnet A and a second lower magnetic conduction plate. The second lower magnetic conduction plate is connected with a lower magnetic conduction plate. The second lower magnetic conduction plate and the lower magnetic conduction plate can be a whole, or they can be connected in parallel or laminated. Between the annular third upper magnetic conductor and the lower magnetic conduction plate is a first annular axial permanent magnet. An outer magnetic gap is formed between the annular third upper magnetic conductor and an annular second upper magnetic conductor. The outer voice coil works in the outer magnetic gap. An inner magnetic gap is formed between the first upper magnetic conductor and the annular second upper magnetic conductor. The inner voice coil works in the inner magnetic gap. The magnetic polarity of the second lower magnetic conduction plate is the same as that of the lower magnetic conduction plate and the second upper magnetic conductor. The first annular axial permanent magnet and the second cylindrical radial permanent magnet A form a closed magnetic circuit in the outer magnetic gap and inner magnetic gap through the first upper magnetic conductor, the annular second upper magnetic conductor, the annular third upper magnetic conductor, the second lower magnetic conduction plate and the lower magnetic conduction plate. The fin groove corresponding to the fin is provided on the second upper magnetic conductor.

Preferably, a second lower magnetic conductor is connected below the first upper magnetic conductor. Above the second lower magnetic conductor is a second annular radial permanent magnet B. Above the second annular radial permanent magnet B is the lower magnetic conduction plate. Above the lower magnetic conduction plate is the first annular axial permanent magnet. Above the first annular axial permanent magnet is the annular third upper magnetic conductor. An outer magnetic gap is formed between the annular third upper magnetic conductor and the annular second upper magnetic conductor. The outer voice coil works in the outer magnetic gap. An inner magnetic gap is formed between the first upper magnetic conductor and the annular second upper magnetic conductor. The inner voice coil works in the inner magnetic gap. The annular third upper magnetic conductor and the second lower magnetic conductor are the same magnetic polarity. The first annular axial permanent magnet and the second annular radial permanent magnet B form a closed magnetic circuit in the outer magnetic gap and inner magnetic gap through the first upper magnetic conductor, the annular second upper magnetic conductor, the annular third upper magnetic conductor, the lower magnetic conduction plate and the second lower magnetic conductor. The fin groove corresponding to the fin is provided on the second upper magnetic conductor.

Preferably, the first upper magnetic conductor is arranged in the center of a magnetic conductive bowl. An annular radial permanent magnet C is provided in the magnetic conductive bowl. The inner diameter of the annular radial permanent magnet C is greater than the maximum outer diameter of the first upper magnetic conductor. The outer diameter of the annular radial permanent magnet C is smaller than the inner diameter of the magnetic conductive bowl. The annular second upper magnetic conductor is arranged above the annular radial permanent magnet C. An outer magnetic gap is formed between the annular second upper magnetic conductor and the annular third upper magnetic conductor on the magnetic conductive bowl. The outer voice coil works in the outer magnetic gap. An inner magnetic gap is formed between the annular second upper magnetic conductor and the first upper magnetic conductor. The inner voice coil works in the inner magnetic gap. The annular radial permanent magnet C is magnetized in the axial direction, forming a closed magnetic circuit in the outer magnetic gap and inner magnetic gap through the magnetic conductive bowl, the first upper magnetic conductor and the annular second upper magnetic conductor. The fin groove corresponding to the fin is provided on the second upper magnetic conductor. The outer ring of the magnetic conductive bowl is replaced with an annular radial permanent magnet D. As a replacement, a cylindrical radial permanent magnet E is provided between the first upper magnetic conductor and the bottom of the magnetic conductive bowl. The annular radial permanent magnet D, the cylindrical radial permanent magnet E and the annular radial permanent magnet C are magnetized in reverse, and the three permanent magnets form a series relationship. The outer magnetic gap and the inner magnetic gap obtain high magnetic flux density.

Preferably, the first upper magnetic conductor is the center, and the top inner magnetic gap is formed between the first upper magnetic conductor and the annular second upper magnetic conductor. The top outer magnetic gap is formed between the annular second upper magnetic conductor and the third upper magnetic conductor. Below the first upper magnetic conductor are, in turn, the cylindrical radial permanent magnets E, and a first lower magnetic conductor. Below the annular second upper magnetic conductor are, in turn, the annular radial permanent magnet C, and a second lower magnetic conductor. Below the annular third upper magnetic conductor are, in turn, the annular radial permanent magnet D, the annular third lower magnetic conductor. A bottom inner magnetic gap is formed between the first lower magnetic conductor and the annular second lower magnetic conductor. The bottom inner magnetic gap and the top inner magnetic gap are integrally connected. The inner voice coil extends from the top inner magnetic gap to the bottom inner magnetic gap. On the inner voice coil, a conductive coil of the top inner voice coil and a conductive coil of the bottom inner voice coil are respectively wound at the top inner magnetic gap and the bottom inner magnetic gap. A bottom outer magnetic gap is formed between the second lower magnetic conductor and the annular third lower magnetic conductor. A bottom outer magnetic gap and the top outer magnetic gap are integrally connected; wherein the outer voice coil extends from the top outer magnetic gap to the bottom outer magnetic gap. A conductive coil of the top outer voice coil and a conductive coil of the bottom outer voice coil are respectively wound at the corresponding top outer magnetic gap and the bottom outer magnetic gap. The outer voice coil and the inner voice coil are connected by the top fin passing through the second upper magnetic conductor and the bottom fin through the annular second lower magnetic conductor. The annular second upper magnetic conductor is provided with a fin groove corresponding to the top fin. The annular second lower magnetic conductor is provided with a fin groove corresponding to the bottom fin. The annular radial permanent magnet D and the cylindrical radial permanent magnet E are magnetized in the same direction. The magnetizing direction of the annular radial permanent magnet C is opposite to that of the annular radial permanent magnet D and the cylindrical radial permanent magnet E. Through the six magnetic conductor of the first upper magnetic conductor, the annular second upper magnetic conductor, the annular third upper magnetic conductor, the first lower magnetic conductor, the annular second lower magnetic conductor and the annular third lower magnetic conductor, the three permanent magnets of the annular radial permanent magnet C, annular radial permanent magnet D and the cylindrical radial permanent magnet E form a closed magnetic circuit in the four positions of the top inner magnetic gap, the top outer magnetic gap, the bottom outer magnetic gap and the bottom outer magnetic gap.

Preferably, the first upper magnetic conductor is arranged in the center of the magnetic conductive bowl. An annular radial permanent magnet F is provided between the first upper magnetic conductor and the third upper magnetic conductor in the magnetic conductive bowl. The annular radial permanent magnet F is connected and fixed to the bottom of the magnetic conductive bowl through a non-magnetic conductive gasket. The outer magnetic gap is formed between the annular radial permanent magnet F and the third upper magnetic conductor. The outer voice coil is arranged in the outer magnetic gap. The inner magnetic gap is formed between the annular radial permanent magnet F and the first upper magnetic conductor. The inner voice coil works in the inner magnetic gap. Magnetized radially, the annular radial permanent magnet F forms a closed magnetic circuit in the inner magnetic gap and the top outer magnetic gap with the first upper magnetic conductor and the third upper magnetic conductor. The fin groove corresponding to the fin is provided on the annular radial permanent magnet F. The four coils of the conductive coil of the top outer voice coil, the conductive coil of the top inner voice coil, the conductive coil of the bottom inner voice coil, and the conductive coil of the bottom inner voice coil can be connected in three ways: series, parallel, and independent external signals.

Preferably, the fin dual voice coil has three forms: outer voice coil single connection diaphragm, inner voice coil single connection diaphragm, inner voice coil and outer voice coil dual connection diaphragm at the same time.

Preferably, the fin dual voice coil has three forms: the inner magnetic gap and the outer magnetic gap are flush; the outer magnetic gap is higher than the inner magnetic gap; the inner magnetic gap is higher than the outer magnetic gap.

Preferably, the voice coil is a direct conductive coil without a skeleton. The fins are directly fixed and connected to the conductive coil.

Preferably, the fins are arranged outside the maximum stroke range of the loudspeaker. The fins can be arranged in a width direction parallel to the voice coil axis, or can be arranged at any angle between plus or minus 45 degrees with the voice coil axis.

Preferably, the fins, with the width direction parallel to the voice coil axis or at any angle between plus and minus 45 degrees with the voice coil axis, can be connected and fixed to the diaphragm. The connecting part of the fin and the diaphragm is in accordance with the shape of the diaphragm.

Preferably, the permanent magnet A can be replaced with an excitation source.

Preferably, there is a fin connection between the outer voice coil and the inner voice coil. There is a fin or a fin voice coil in the inner voice coil.

Preferably, there are at least two fins. The fins intersect each other and connect to the center point of the magnetic conduction column.

Preferably, there are at least two fins. Parts of the fins radially intersect each other and connect to the center point of the magnetic conduction column, and the height of the intersecting part is smaller than that of the voice coil in the radial direction. Intersecting each other and connecting to the center point of the magnetic conduction column, the fins extend upward to the same height as the voice coil and do not intersect each other.

Beneficial effects: Based on the fact that the voice coil is important in the entire loudspeaker and needs to be improved, the invention has done lot of research work. There is a reinforced fin structure in the direction of voice coil deformation. Two adjacent fins and the voice coil wall together form a highly stable triangle state to keep the voice coil stable when working at high temperature and high speed. In order to be able to apply a new type of voice coil, a new design of the loudspeaker magnetic circuit structure is made to complete an overall high-performance loudspeaker. The voice coil in this application can easily achieve dual-point drive. Compared with the single-point drive, balance performance and the stability of the voice coil are greatly improved. Compared with the traditional voice coil, the distortion of the voice coil is greatly reduced. The advantage of dual voice coils is that the heat dissipation performance of the voice coil is improved, the withstand power is doubled, and it can continue to work at high sound pressure. The advantage of the dual voice coil is also its high sensitivity. It means that to obtain the same sound pressure, the output power of the required power is greatly reduced to save energy. This is important for loudspeakers in mobile use scenarios. The parts not involved in the device are the same as the existing technology or can be realized through the current technology. The invention has scientific and reasonable structure, safe and convenient usage, and provides great help for people.

BRIEF DESCRIPTION OF THE DRAWINGS

The attached figures are used to provide a further understanding of the invention, and constitute a part of the specification. Together with the embodiments of the invention, the figures are used to explain the invention, and do not constitute a limitation to the invention.

Figure 1:
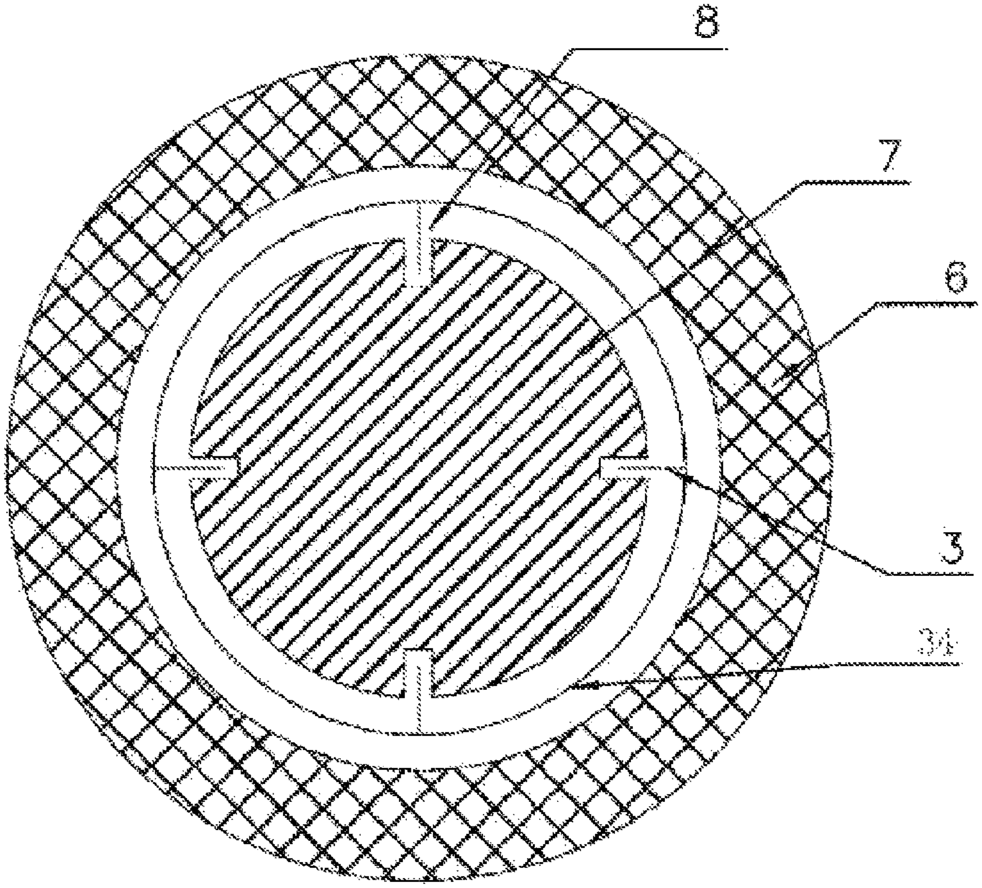
FIG. 1 is a top view of the single voice coil structure of the invention.
Figure 2:
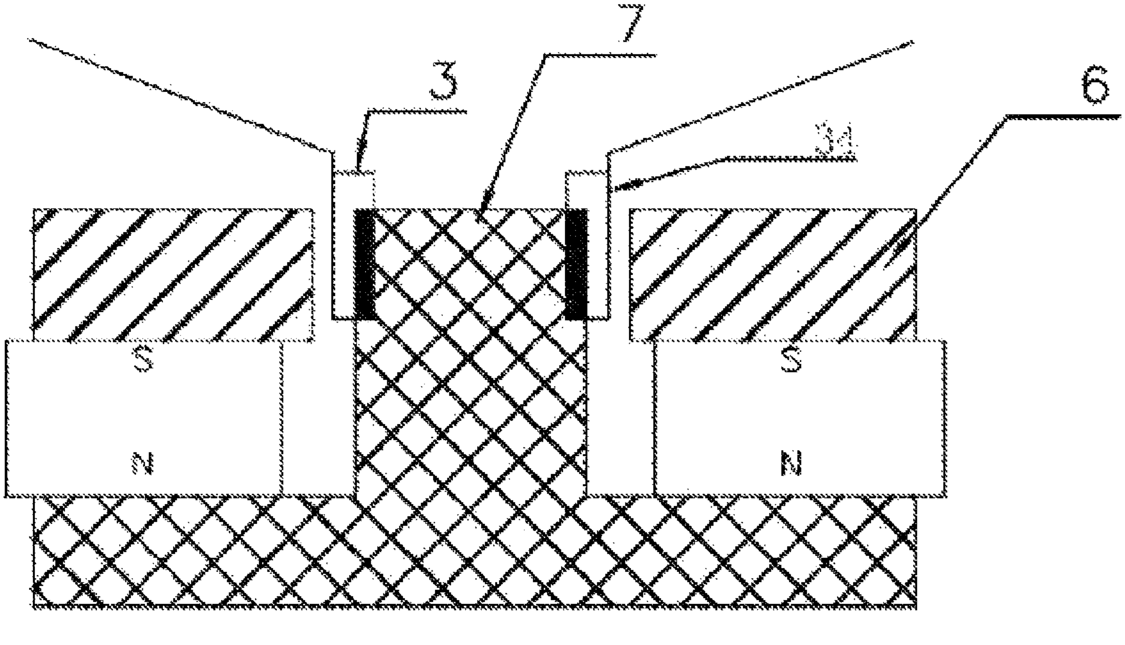
FIG. 2 is a side sectional view of the single voice coil structure of the invention.
Figure 3:
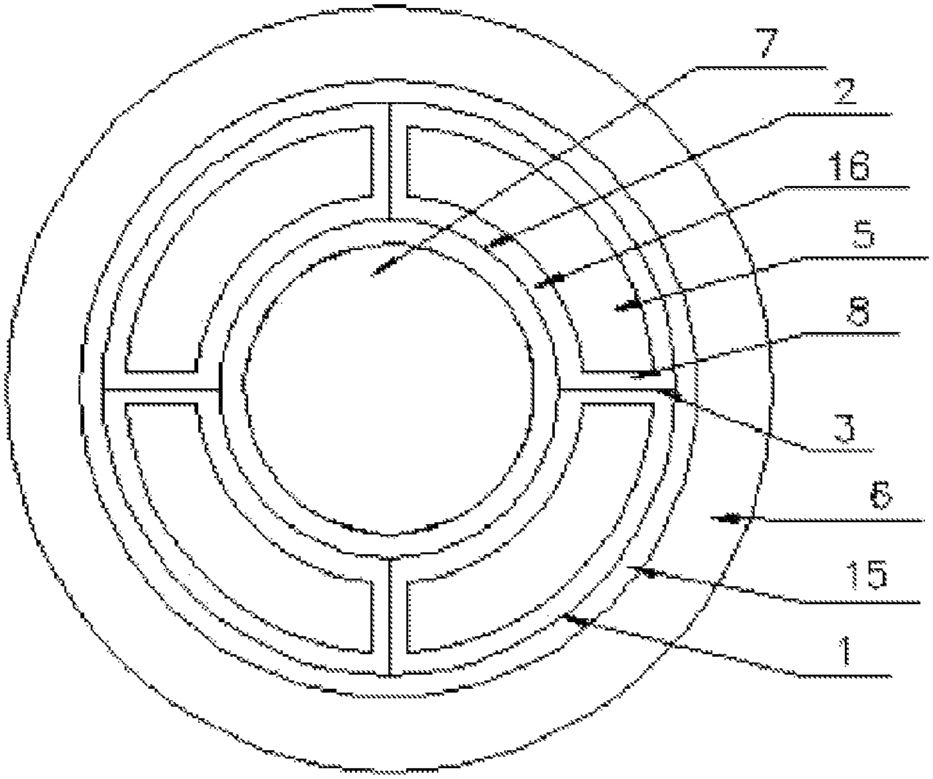
FIG. 3 is a top view of the loudspeaker with a dual voice coil fin structure of the invention.
Figure 4:
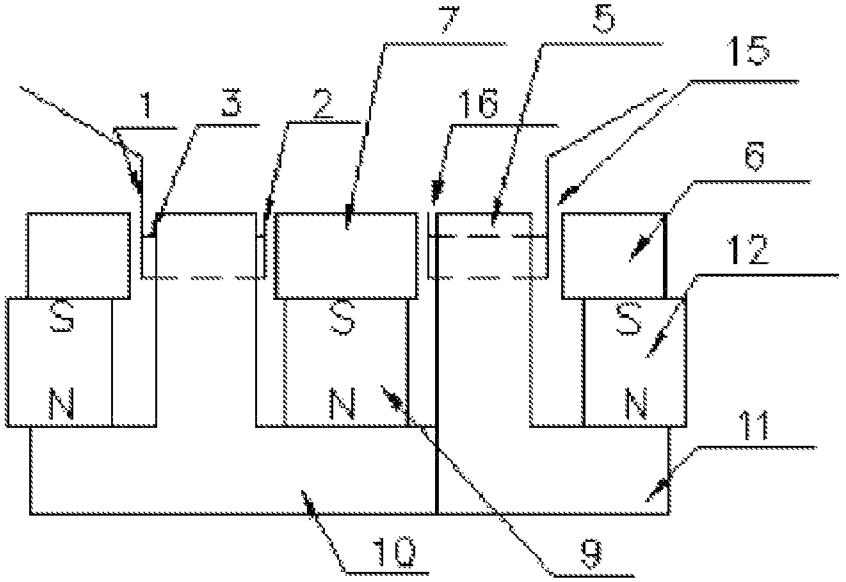
FIG. 4 is a side view of the loudspeaker with a dual voice coil fin structure of the invention.
Figure 5:
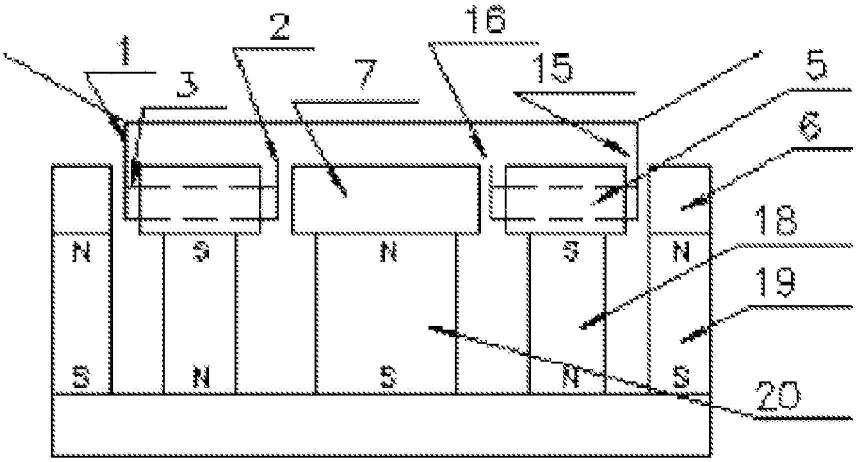
FIG. 5 is a side view of the outer voice coil and the inner voice coil of the invention.
Figure 6:
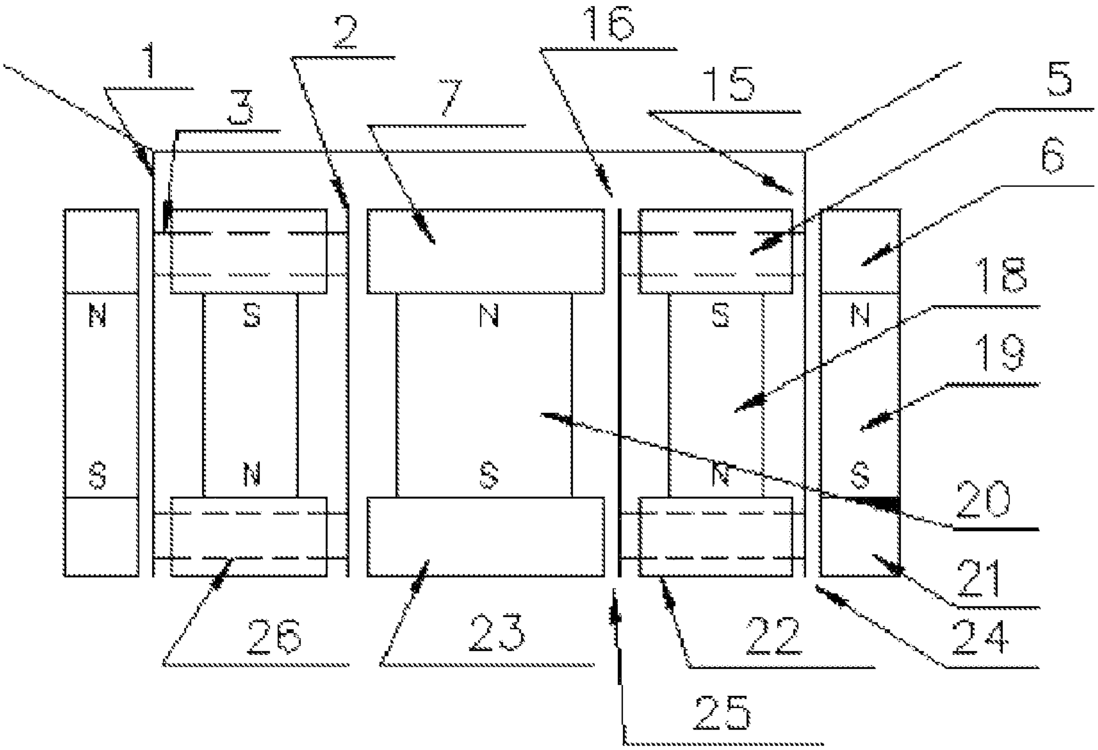
FIG. 6 is a structural schematic diagram of the outer voice coil and the inner voice coil of the invention.
Figure 7:
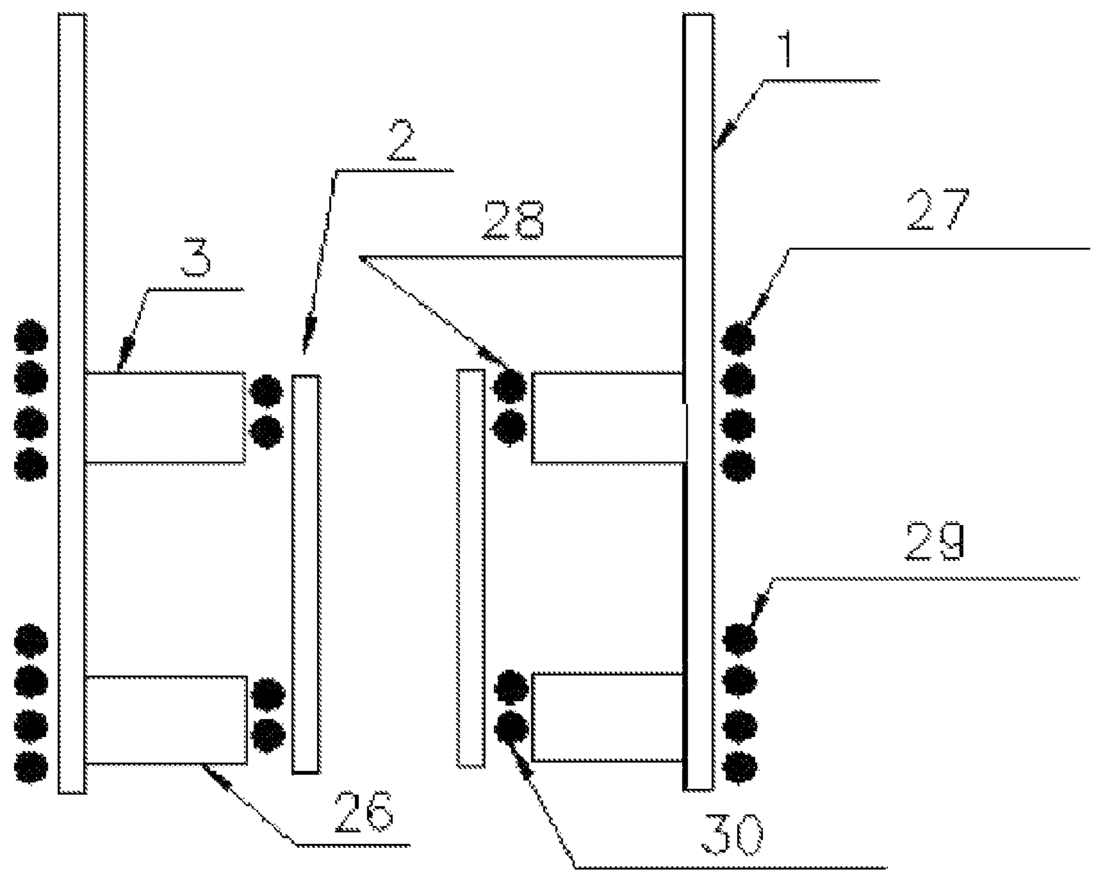
FIG. 7 is a side view of the voice coil of the invention.
Figure 8:
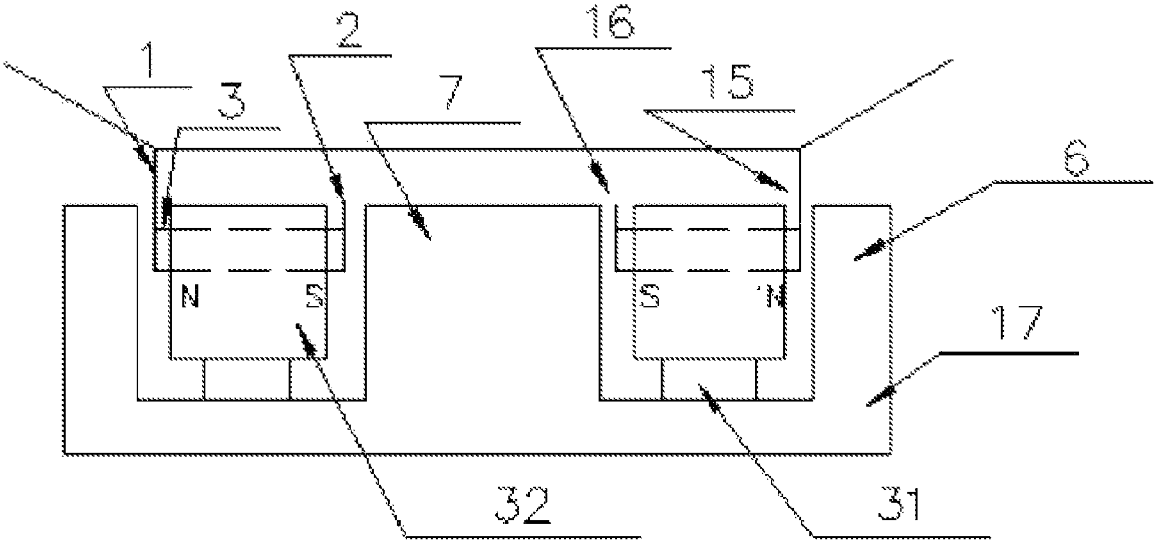
FIG. 8 is a structural schematic diagram of the non-magnetic gasket of the invention.
Figure 9:
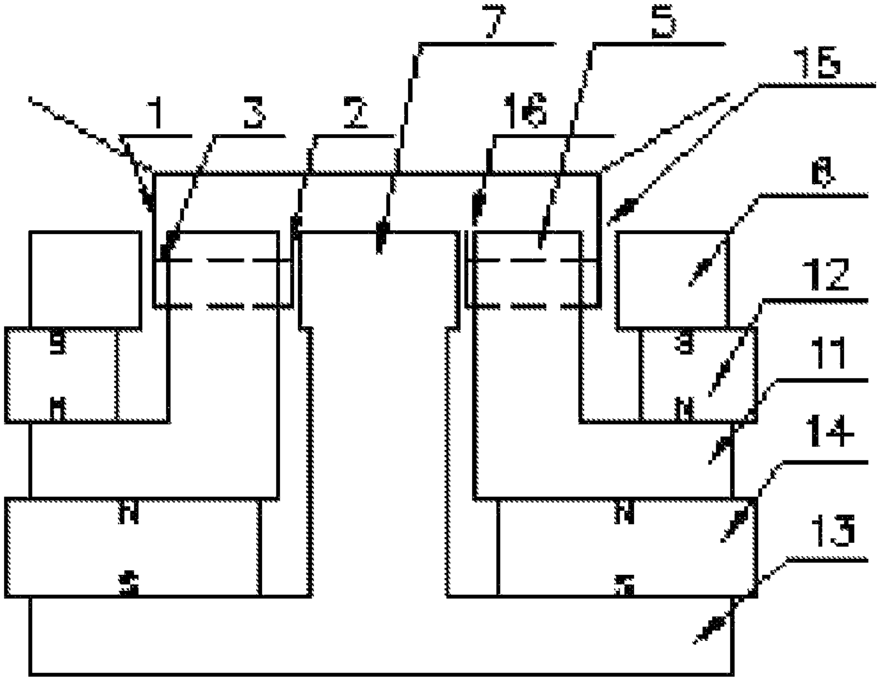
FIG. 9 is a structural schematic diagram of the second lower magnetic conductor of the invention.
Figure 10:
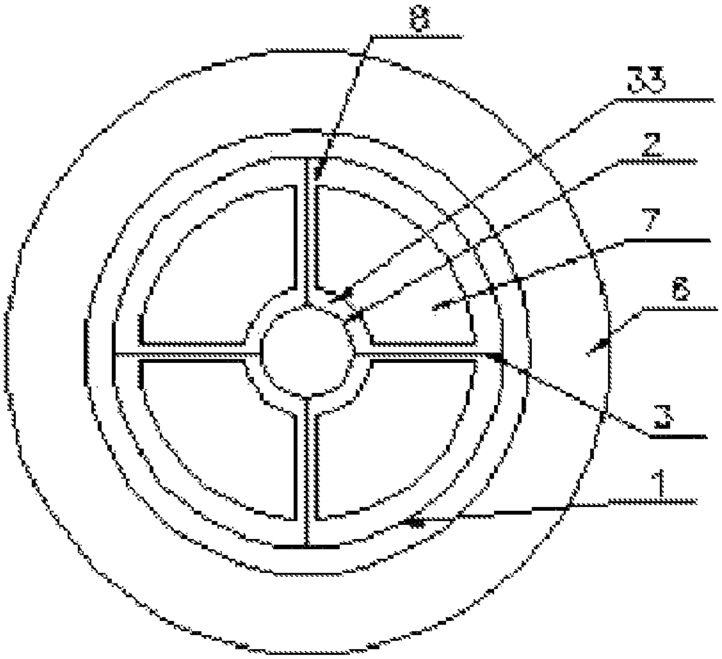
FIG. 10 is a structural schematic diagram of the inner coil groove of the invention.
Figure 11:
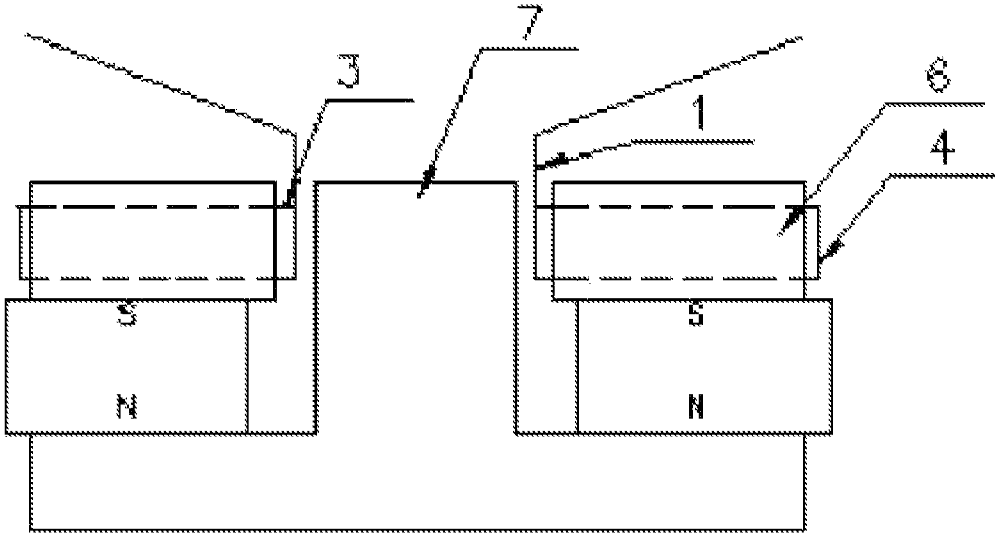
FIG. 11 is a structural schematic diagram of the outer ring of the invention.

In the picture: 1. Outer voice coil; 2. Inner voice coil; 3. Fins; 4. Outer ring; 5. Annular second upper magnetic conductor; 6. Annular third upper magnetic conductor; 7. First upper magnetic conductor; 8. Fin grooves; 9. Permanent magnet A; 10. The second lower magnetic conduction plate; 11. The lower magnetic conduction plate; 12. The first annular axial permanent magnet; 13. The second lower magnetic conductor; 14. Permanent magnet B; 15. Outer magnetic gap; 16. Inner magnetic gap; 17. Magnetic conduction bowl; 18. Permanent magnet C; 19. Permanent magnet D; 20. Permanent magnet E; 21. Annular third lower magnetic conductor; 22. Annular second lower magnetic conductor; 23. First lower magnetic conductor; 24. Bottom outer magnetic gap; 25. Bottom inner magnetic gap; 26. Bottom fin; 27. Conductive coil of top outer voice coil; 28. Conductive coil of top inner voice coil; 29. Conductive coil of the bottom inner voice coil; 30. Conductive coil of the bottom inner voice coil; 31. Non-magnetic gasket; 32. Permanent magnet F; 33. Inner coil groove; 34. Voice coil; 35. Axial Fins.

DETAILED DESCRIPTION OF THE PREFERRED EMBODIMENTS

The technical solutions in the embodiments of the invention will be clearly and completely described below in conjunction with the attached figures in the embodiments of the invention. Obviously, the described embodiments are only a part of the embodiments of the invention, rather than all the embodiments. Based on the embodiments of the invention, all other embodiments obtained by those of ordinary skill in the art without creative work shall fall within the protection scope of the invention.

According to the FIG. 1-11, the invention provides a technical solution: A loudspeaker with a fin-reinforced voice coil structure comprises a voice coil (34), fins (3), an upper magnetic conductor (6), and a magnetic conduction column (7). A magnetic gap is formed between the upper magnetic conductor (6) and the magnetic conduction column (7) located in the center thereof. The voice coil (34) works in the magnetic gap. The inner wall of the voice coil (34) is connected to the fins (3). One end of each fin (3) is connected and fixed to the inner wall of the voice coil (34). The magnetic conduction column (7) is provided with fin grooves (8) for accommodating the other ends of the fins (3). The width of the fin grooves (8) is at least 0.2 mm greater than the thickness of the fins.

The voice coil (34) includes an inner voice coil (2) and an outer voice coil (1) to form a finned double voice coil. The outer voice coil (1) and the inner voice coil (2) are both in the shape of a hollow barrel. The outer voice coil (1) and the inner voice coil (2) are both wound with a conductive coil, and the outer layer of the conductive coil is provided with insulating material. The magnetic conduction column is the first upper magnetic conductor (7). The upper magnetic conductor is an annular third upper magnetic conductor (6). The conductive coils of the outer voice coil (1) and the inner voice coil (2) are connected in series, in parallel, or independently connected. There is a fin (3) connection between the outer voice coil (1) and the inner voice coil (2), and the fin 3 is connected and fixed on the inner wall of the outer voice coil (1) and the outer wall of the inner voice coil (2). The fins (3) can be connected and fixed on the conductive coil. The annular second upper magnetic conductor (5) is provided with a fin groove (8) corresponding to the fin (3). The fin groove (8) penetrates the annular second upper magnetic conductor (5), so that the outer magnetic gap (15) is connected to the inner magnetic gap (16). The width of the fin groove (8) must be greater than the thickness of the fin 0.2 mm. The depth of the fin groove (8) must be greater than or equal to the linear stroke set by the loudspeaker. The outer voice coil (1) works in the outer magnetic gap (15) between the annular second upper magnetic conductor (5) and the annular third upper magnetic conductor (6). The inner voice coil (2) is installed in the inner magnetic gap (16) between the annular second upper magnetic conductor (5) and the first upper magnetic conductor (7).

Below the first upper magnetic conductor (7) are a second cylindrical radial permanent magnet A (9) and a second lower magnetic conduction plate (10). The second lower magnetic conduction plate (10) is connected with a lower magnetic conduction plate (11). The second lower magnetic conduction plate (10) and the lower magnetic conduction plate (11) can be a whole, or they can be connected in parallel or laminated. Between the annular third upper magnetic conductor (6) and the lower magnetic conduction plate (11) is a first annular axial permanent magnet (12). An outer magnetic gap (15) is formed between the annular third upper magnetic conductor (6) and an annular second upper magnetic conductor (5). The outer voice coil (1) works in the outer magnetic gap (15). An inner magnetic gap (16) is formed between the first upper magnetic conductor (7) and the annular second upper magnetic conductor (5). The inner voice coil (2) works in the inner magnetic gap (16). The magnetic polarity of the second lower magnetic conduction plate (10) is the same as that of the lower magnetic conduction plate (11) and the second upper magnetic conductor (5). The first annular axial permanent magnet (12) and the second cylindrical radial permanent magnet A (9) form a closed magnetic circuit in the outer magnetic gap (15) and inner magnetic gap (16) through the first upper magnetic conductor (7), the annular second upper magnetic conductor (5), the annular third upper magnetic conductor (6), the second lower magnetic conduction plate (10) and the lower magnetic conduction plate (11). The fin groove (8) corresponding to the fin (3) is provided on the second upper magnetic conductor (5).

The first upper magnetic conductor (7) is arranged in the center of a magnetic conductive bowl (17). An annular radial permanent magnet C (18) is provided in the magnetic conductive bowl (17). The inner diameter of the annular radial permanent magnet C (18) is greater than the maximum outer diameter of the first upper magnetic conductor (7). The outer diameter of the annular radial permanent magnet C (18) is smaller than the inner diameter of the magnetic conductive bowl (17). The annular second upper magnetic conductor (5) is arranged above the annular radial permanent magnet C (18). An outer magnetic gap (15) is formed between the annular second upper magnetic conductor (5) and the annular third upper magnetic conductor (6) on the magnetic conductive bowl (17). The outer voice coil (1) works in the outer magnetic gap (15). An inner magnetic gap (16) is formed between the annular second upper magnetic conductor (5) and the first upper magnetic conductor (7). The inner voice coil (2) works in the inner magnetic gap (16). The annular radial permanent magnet C (18) is magnetized in the axial direction, forming a closed magnetic circuit in the outer magnetic gap (15) and inner magnetic gap (16) through the magnetic conductive bowl (17), the first upper magnetic conductor (7) and the annular second upper magnetic conductor (5). The fin groove (8) corresponding to the fin (3) is provided on the second upper magnetic conductor (5). The outer ring of the magnetic conductive bowl (17) is replaced with an annular radial permanent magnet D (19). As a replacement, a cylindrical radial permanent magnet E (20) is provided between the first upper magnetic conductor (7) and the bottom of the magnetic conductive bowl (17). The annular radial permanent magnet D (19), the cylindrical radial permanent magnet E (20) and the annular radial permanent magnet C (18) are magnetized in reverse, and the three permanent magnets form a series relationship. The outer magnetic gap (15) and the inner magnetic gap (16) obtain high magnetic flux density.

The first upper magnetic conductor (7) is the center, and the top inner magnetic gap (16) is formed between the first upper magnetic conductor (7) and the annular second upper magnetic conductor (5). The top outer magnetic gap (15) is formed between the annular second upper magnetic conductor (5) and the third upper magnetic conductor (6). Below the first upper magnetic conductor (7) are, in turn, the cylindrical radial permanent magnets E (20), and a first lower magnetic conductor (23). Below the annular second upper magnetic conductor (5) are, in turn, the annular radial permanent magnet C (18), and a second lower magnetic conductor (22). Below the annular third upper magnetic conductor (6) are, in turn, the annular radial permanent magnet D (19), the annular third lower magnetic conductor (21). A bottom inner magnetic gap (25) is formed between the first lower magnetic conductor (23) and the annular second lower magnetic conductor (22). The bottom inner magnetic gap (25) and the top inner magnetic gap (16) are integrally connected. The inner voice coil (2) extends from the top inner magnetic gap (16) to the bottom inner magnetic gap (25). On the inner voice coil (2), a conductive coil of the top inner voice coil (28) and a conductive coil of the bottom inner voice coil (30) are respectively wound at the top inner magnetic gap (16) and the bottom inner magnetic gap (25). A bottom outer magnetic gap (25) is formed between the second lower magnetic conductor (22) and the annular third lower magnetic conductor (21). A bottom outer magnetic gap (24) and the top outer magnetic gap (15) are integrally connected. The outer voice coil (1) extends from the top outer magnetic gap (15) to the bottom outer magnetic gap (24). A conductive coil of the top outer voice coil (27) and a conductive coil of the bottom outer voice coil are respectively wound at the corresponding top outer magnetic gap (15) and the bottom outer magnetic gap (24). The outer voice coil (1) and the inner voice coil (2) are connected by the top fin (3) passing through the second upper magnetic conductor (5) and the bottom fin (26) through the annular second lower magnetic conductor (22). The annular second upper magnetic conductor (5) is provided with a fin groove corresponding to the top fin (3). The annular second lower magnetic conductor (22) is provided with a fin groove corresponding to the bottom fin (26). The annular radial permanent magnet D (19) and the cylindrical radial permanent magnet E (20) are magnetized in the same direction; wherein the magnetizing direction of the annular radial permanent magnet C (18) is opposite to that of the annular radial permanent magnet D (19) and the cylindrical radial permanent magnet E (20). Through the six magnetic conductor of the first upper magnetic conductor (7), the annular second upper magnetic conductor (5), the annular third upper magnetic conductor (6), the first lower magnetic conductor (23), the annular second lower magnetic conductor (22) and the annular third lower magnetic conductor (21), the three permanent magnets of the annular radial permanent magnet C (18), annular radial permanent magnet D (19) and the cylindrical radial permanent magnet E (20) form a closed magnetic circuit in the four positions of the top inner magnetic gap (16), the top outer magnetic gap (15), the bottom outer magnetic gap (24) and the bottom outer magnetic gap (25). The four coils of the conductive coil of the top outer voice coil (27), the conductive coil of the top inner voice coil (28), the conductive coil of the bottom inner voice coil (29), and the conductive coil of the bottom inner voice coil (30) can be connected in three ways: series, parallel, and independent external signals.

The first upper magnetic conductor (7) is arranged in the center of the magnetic conductive bowl (17). An annular radial permanent magnet F (32) is provided between the first upper magnetic conductor (7) and the third upper magnetic conductor (6) in the magnetic conductive bowl (17). The annular radial permanent magnet F (32) is connected and fixed to the bottom of the magnetic conductive bowl (17) through a non-magnetic conductive gasket (31). The outer magnetic gap (15) is formed between the annular radial permanent magnet F (32) and the third upper magnetic conductor (6). The outer voice coil (1) is arranged in the outer magnetic gap (15). The inner magnetic gap (16) is formed between the annular radial permanent magnet F (32) and the first upper magnetic conductor (7). The inner voice coil (2) works in the inner magnetic gap (16). Magnetized radially, the annular radial permanent magnet F (32) forms a closed magnetic circuit in the inner magnetic gap (16) and the top outer magnetic gap (15) with the first upper magnetic conductor (7) and the third upper magnetic conductor (6). The fin groove (8) corresponding to the fin (3) is provided on the annular radial permanent magnet F (32).

The fin dual voice coil has three forms: outer voice coil (1) single connection diaphragm, inner voice coil (2) single connection diaphragm, inner voice coil (2) and outer voice coil (1) dual connection diaphragm (35) at the same time.

The fin dual voice coil has three forms: the inner magnetic gap (16) and the outer magnetic gap (15) are flush; the outer magnetic gap (15) is higher than the inner magnetic gap (16); the inner magnetic gap (16) is higher than the outer magnetic gap (15).

The voice coil is a direct conductive coil without a skeleton. The fins (3) are directly fixed and connected to the conductive coil.

When only the outer voice coil (1) or the inner voice coil (2) in the fin dual voice coil is wound with a conductive coil, the other voice coil and fin are the reinforcement members of the wound voice coil. There are four types of intersecting fin reinforcement, inner ring intersecting fin reinforcement, outer fin reinforcement, and outer fin and outer ring reinforcement. The inner fin intersecting reinforcement structure is that: a magnetic gap is formed between the upper magnetic conductor (6) and the magnetic conductor (7) located in the center; the outer voice coil (1) works in a magnetic gap; the inner wall of the outer voice coil (1) is connected by fins (3); the two ends of the fin (3) are connected and fixed on the inner wall of the outer voice coil (1); when there are more than two fins (3), the fins directly intersect and connect to the center point; the magnetic conductor (7) is provided with a fin groove (8) corresponding to the fin (3); the width of the fin groove (8) must be greater than the thickness of the fin 0.2 mm; the fin groove (8) penetrates the magnetic conductor (7), so that the fins (8) connected to the inner wall of the outer voice coil (1) runs without hindrance; the depth of the fin groove (8) must be greater than or equal to the linear stroke set by the loudspeaker. The inner ring intersecting fin reinforcement is that: a magnetic gap is formed between the upper magnetic conductor (6) and the magnetic conductor (7) located in the center; the outer voice coil (1) works in the magnetic gap; the magnetic conduction column (7) is provided with the fin groove (8) corresponding to the fin (3) and the inner coil groove (33) corresponding to the inner voice coil (2); the two sides of the fin (3) are connected to the inner wall of the outer voice coil (1) and the outer wall of the inner voice coil (2); the diameter of the inner coil groove (33) is greater than the diameter of the inner voice coil (2) by 0.2 mm; the width of the fin groove (8) must be greater than the fin thickness 0.2 mm; the depth of the inner coil groove (33) and the fin groove (8) must be greater than or equal to the linear stroke set by the loudspeaker. The outer fin reinforcement is that: a magnetic gap is formed between the upper magnetic conductor (6) and the magnetic conductor (7) located in the center; the outer voice coil (1) works in a magnetic gap; the upper magnetic conduction column (6) is provided with the fin groove (8) corresponding to the fin (3); the width of the fin groove (8) must be greater than the thickness of the fin 0.2 mm; the fin (3) is connected to the outer wall of the voice coil (1); the depth of the fin groove (8) must be greater than or equal to the linear stroke set by the loudspeaker. The outer fin and outer ring reinforcement is that: a magnetic gap is formed between the upper magnetic conductor (6) and the magnetic conductor (7) located in the center; the outer voice coil (1) works in a magnetic gap; the upper magnetic conduction column (6) is provided with the fin groove (8) corresponding to the fin (3); the width of the fin groove (8) must be greater than the thickness of the fin 0.2 mm; the fin (3) is connected to the outer wall of the voice coil (1) and the inner wall of the outer ring (4); the depth of the fin groove (8) must be greater than or equal to the linear stroke set by the loudspeaker.

The fin (3) is arranged outside the maximum stroke range of the loudspeaker. The fin (3) can be arranged in a width direction parallel to the voice coil axis, or can be arranged at any angle between plus or minus 45 degrees with the voice coil axis.

The fin (3), with the width direction parallel to the voice coil axis or at any angle between plus and minus 45 degrees with the voice coil axis, can be connected and fixed to the diaphragm. The connecting part of the fin (3) and the diaphragm is in accordance with the shape of the diaphragm.

The permanent magnet A can be replaced with an excitation source.

There is a fin (3) connection between the outer voice coil (1) and the inner voice coil (2). There is a fin (3) or a fin voice coil in the inner voice coil (2).

The technical solution can also constitute a finned dual voice coil loudspeaker. It has six fins (3) with a thickness of 1 mm. The inner voice coil (2) and the outer voice coil (1) are wound with conductive coils. The conductive coils on the inner and outer voice coils are connected in series. The voice coil winding method is internal and external winding, that is, coils are wound on the inner and outer walls of the voice coil. The fins (3) are fixed on the conductive coils on the inner wall of the outer voice coil (1) and the outer wall of the inner voice coil (2) with glue. The loudspeaker of this embodiment uses six fins (3). The annular second upper magnetic conductor (5) is provided with six fin grooves (8) corresponding to the fins (3). The width of the fin grooves (8) is 2 mm. The linear stroke of the loudspeaker design is plus or minus 6 mm. The depth of the fin groove (8) is 15 mm. The loudspeaker has the inner magnetic gap (16) and the outer magnetic gap (15) flush. The outer voice coil (1) is connected to the loudspeaker diaphragm. The inner voice coil (2) is not connected to the diaphragm. Below the first upper magnetic conductor (7) are a second cylindrical radial permanent magnet A (9) and a second lower magnetic conduction plate (10). The second lower magnetic conduction plate (10) is connected with a lower magnetic conduction plate (11). Between the annular third upper magnetic conductor (6) and the lower magnetic conduction plate (11) is a first annular axial permanent magnet (12). An outer magnetic gap (15) is formed between the annular third upper magnetic conductor (6) and an annular second upper magnetic conductor (5). The outer voice coil (1) works in the outer magnetic gap (15). An inner magnetic gap (16) is formed between the first upper magnetic conductor (7) and the annular second upper magnetic conductor (5). The inner voice coil (2) works in the inner magnetic gap (16). The magnetic polarity of the second lower magnetic conduction plate (10) is the same as that of the lower magnetic conduction plate (11) and the second upper magnetic conductor (5). The first annular axial permanent magnet (12) and the second cylindrical radial permanent magnet A (9) form a closed magnetic circuit to drive the outer voice coil (1) and the inner voice coil (2) to work in the outer magnetic gap (15) and inner magnetic gap (16) through the first upper magnetic conductor (7), the annular second upper magnetic conductor (5), the annular third upper magnetic conductor (6), the second lower magnetic conduction plate (10) and the lower magnetic conduction plate (11).

The technical solution can also constitute a horn drive head with a convex diaphragm and a finned dual voice coil. This embodiment uses two fins (3) with a thickness of 0.8 mm. the inner magnetic gap (16) is higher than the outer magnetic gap (15). The inner voice coil (2) and the outer voice coil (1) are connected to the diaphragm. The inner voice coil (2) and the outer voice coil (1) are wound with conductive coils. The conductive coils on the inner and outer voice coils are connected in series. The voice coil winding method is a single-layer winding on the outer wall of the voice coil. The fins (3) are fixed on the inner wall of the outer voice coil (1) and the outer wall coil of the inner voice coil (2) by glue. The loudspeaker of this embodiment uses two fins (3). The annular second upper magnetic conductor (5) is provided with two fin grooves (8) corresponding to the fins (3). The width of the fin grooves (8) is 1.5 mm. The linear stroke of the loudspeaker design is plus or minus 2 mm. The depth of the fin groove (8) is 5 mm. The first upper magnetic conductor (7) is arranged in the center of a magnetic conductive bowl (17). An annular radial permanent magnet C (18) is provided in the magnetic conductive bowl (17). The annular second upper magnetic conductor (5) is arranged above the annular radial permanent magnet C (18). An outer magnetic gap (15) is formed between the annular second upper magnetic conductor (5) and the annular third upper magnetic conductor (6) on the magnetic conductive bowl (17). The outer voice coil (1) works in the outer magnetic gap (15). An inner magnetic gap (16) is formed between the annular second upper magnetic conductor (5) and the first upper magnetic conductor (7). The inner voice coil (2) works in the inner magnetic gap (16). The annular radial permanent magnet C (18) is magnetized in the axial direction, forming a closed magnetic circuit to drive the outer voice coil (1) and the inner voice coil (2) to work in the outer magnetic gap (15) and inner magnetic gap (16) through the magnetic conductive bowl (17), the first upper magnetic conductor (7) and the annular second upper magnetic conductor (5).

The technical solution can also constitute a fin-reinforced loudspeaker. The inner wall of the voice coil (1) is connected by four fins (3). One end of each fin (3) is glued to the inner wall of the voice coil (1). The other ends are intersected and glued to the center point of the magnetic voice coil. The fin thickness is 1.5 mm. The outer wall of the voice coil (1) of this embodiment is wound with a conductive coil. The loudspeaker of this embodiment forms a magnetic gap between the upper magnetic (6) and the magnetic conduction column (7) in the center. The voice coil (1) works in the magnetic gap. The magnetic conductor (7) is provided with four fin grooves (8) corresponding to the fins (3). The width of the fin grooves (8) is 2 mm. The linear stroke of the loudspeaker design is plus or minus 8 mm. The depth of the fin groove (8) is 18 mm.

The technical solution can also constitute a reinforced voice coil loudspeaker with fins and the axis of the voice coil at a 90-degree angle. The inner wall of the voice coil (1) is connected by a fin (3) with four branches. One end of each fin (3) is glued to the inner wall of the outer voice coil (1). The thickness of each fin is 1 mm. The outer wall of the voice coil (1) of this embodiment is wound with a conductive coil. The loudspeaker of this embodiment forms a magnetic gap between the upper magnetic (6) and the magnetic conduction column (7) in the center. The voice coil (1) works in the magnetic gap. The linear stroke of the speaker design of the embodiment is plus or minus 3 mm. The distance between the fin (3) and the magnetic conduction column (7) is 6 mm.

Figure 12:
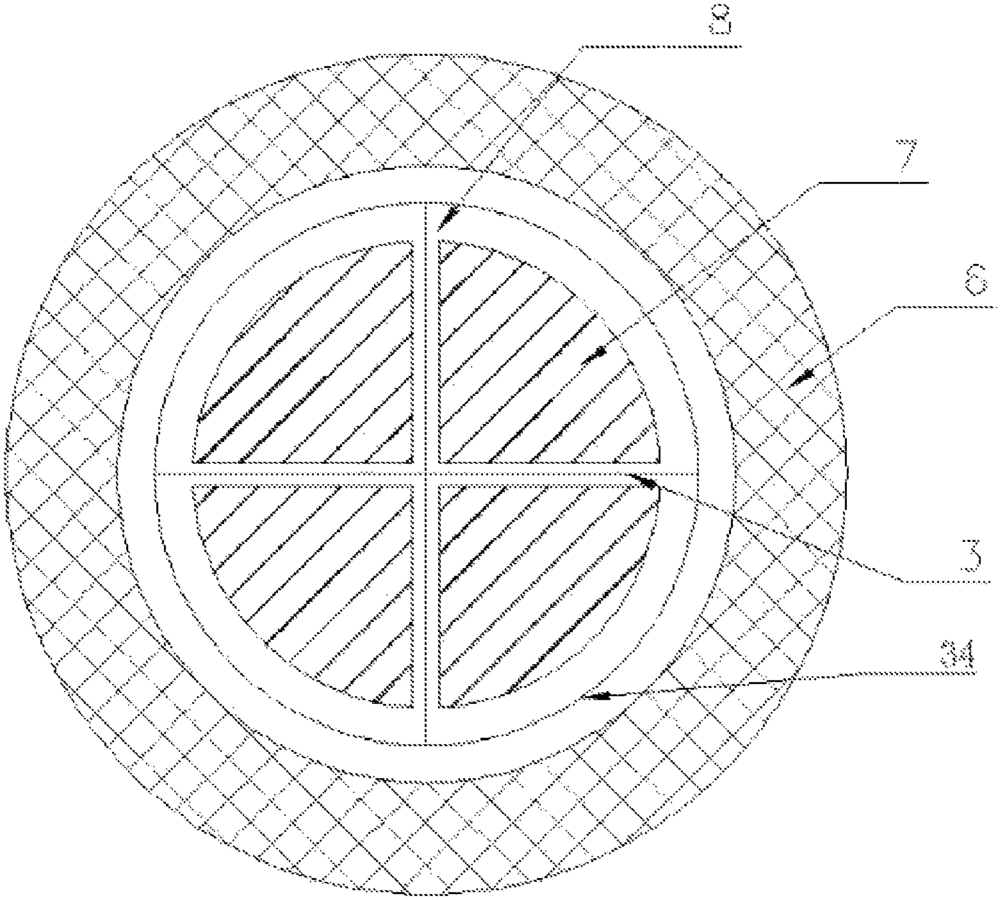
FIG. 12 is a structural schematic diagram of the embodiment of the fin junction of the invention.

The technical solution can also form a fin converging and connection structure. There are four fins (3). The fins (3) are mutually intersecting and connected to the center point of the magnetic conduction column (7), as shown in FIG. 12.

Figure 13:
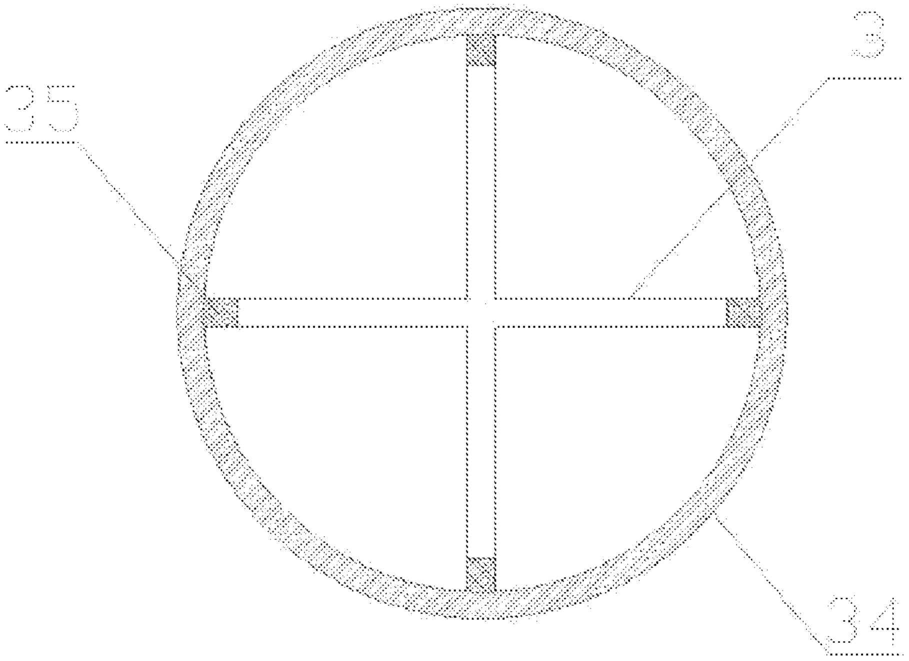
FIG. 13 is a front structural schematic view of the cross-axial fin-reinforced embodiment of the invention.
Figure 14:
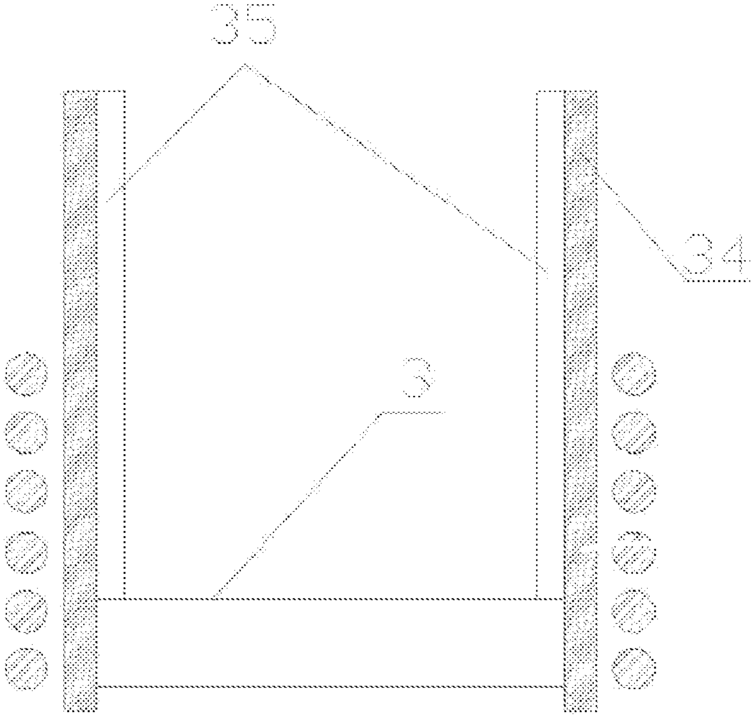
FIG. 14 is a side structural schematic view of the cross-axial fin-reinforced embodiment of the invention.

The technical solution can also have at least two fins 3. A part of the fins (3) in the radial direction intersects each other and connects to the center point of the magnetic conduction column (7). The axial height of the related part is smaller than the height of the voice coil (34). The fins (3) intersecting and connected to the center point of the magnetic column (7) extend upward to the same height as the voice coil (34) without intersecting each other, forming an axial fin (35) in the fins. The fin presents an "L" shape, as shown in FIG. 13-14.

Based on the fact that the voice coil is important in the entire loudspeaker and needs to be improved, the invention has done lot of research work. There is a reinforced fin structure in the direction of voice coil deformation. Two adjacent fins and the voice coil wall together form a highly stable triangle state to keep the voice coil stable when working at high temperature and high speed. In order to be able to apply a new type of voice coil, a new design of the speaker magnetic circuit structure is made to complete an overall high-performance speaker. The voice coil in this application can easily achieve dual-point drive. Compared with the single-point drive, balance performance and the stability of the voice coil are greatly improved. Compared with the traditional voice coil, the distortion of the voice coil is greatly reduced. The advantage of dual voice coils is that the heat dissipation performance of the voice coil is improved, the withstand power is doubled, and it can continue to work at high sound pressure. The advantage of the dual voice coil is also its high sensitivity. It means that to obtain the same sound pressure, the output power of the required power is greatly reduced to save energy. This is important for speakers in mobile use scenarios. The parts not involved in the device are the same as the existing technology or can be realized through the current technology. The invention has scientific and reasonable structure, safe and convenient usage, and provides great help for people.

Although the embodiments of the invention have been shown and described, those of ordinary skill in the art can understand that various changes, modifications, substitutions, and variations can be made to these embodiments without departing from the principle and spirit of the invention. The scope of the invention is defined by the appended claims and their equivalents.

The invention claimed is:

1. A loudspeaker with a fin-reinforced voice coil structure comprises a voice coil (34), fins (3), an upper magnetic conductor (6), and a magnetic conduction column (7), characterized in that: a magnetic gap is formed between the upper magnetic conductor (6) and the magnetic conduction column (7) located in the center thereof; the voice coil (34) works in the magnetic gap; wherein the inner wall of the voice coil (34) is connected to the fins (3); wherein one end of each fin (3) is connected and fixed to the inner wall of the voice coil (34); wherein the magnetic conduction column (7) is provided with fin grooves (8) for accommodating the other ends of the fins (3); wherein the width of the fin grooves (8) is at least 0.2 mm greater than the thickness of the fins; the height of the fins (3) is less than or equal to the height of the voice coil (34).

2. The loudspeaker with a fin-reinforced voice coil structure according to claim 1, wherein the voice coil (34) includes an inner voice coil (2) and an outer voice coil (1) to form a finned double voice coil; wherein the outer voice coil (1) and the inner voice coil (2) are both in the shape of a hollow barrel; wherein the outer voice coil (1) and the inner voice coil (2) are both wound with a conductive coil, and the outer layer of the conductive coil is provided with insulating material; wherein the magnetic conduction column is the first upper magnetic conductor (7); wherein the upper magnetic conductor is an annular third upper magnetic conductor (6).

3. The loudspeaker with a fin-reinforced voice coil structure according to claim 2, wherein below the first upper magnetic conductor (7) are a second cylindrical radial permanent magnet A (9) and a second lower magnetic conduction plate (10); wherein the second lower magnetic conduction plate (10) is connected with a lower magnetic conduction plate (11); wherein between the annular third upper magnetic conductor (6) and the lower magnetic conduction plate (11) is a first annular axial permanent magnet (12); wherein an outer magnetic gap (15) is formed between the annular third upper magnetic conductor (6) and an annular second upper magnetic conductor (5); wherein the outer voice coil (1) works in the outer magnetic gap (15); wherein an inner magnetic gap (16) is formed between the first upper magnetic conductor (7) and the annular second upper magnetic conductor (5); wherein the inner voice coil (2) works in the inner magnetic gap (16); wherein the magnetic polarity of the second lower magnetic conduction plate (10) is the same as that of the lower magnetic conduction plate (11) and the second upper magnetic conductor (5); wherein the first annular axial permanent magnet (12) and the second cylindrical radial permanent magnet A (9) form a closed magnetic circuit in the outer magnetic gap (15) and inner magnetic gap (16) through the first upper magnetic conductor (7), the annular second upper magnetic conductor (5), the annular third upper magnetic conductor (6), the second lower magnetic conduction plate (10) and the lower magnetic conduction plate (11); wherein the fin groove (8) corresponding to the fin (3) is provided on the second upper magnetic conductor (5).

4. The loudspeaker with a fin-reinforced voice coil structure according to claim 2, wherein a second lower magnetic conductor (13) is connected below the first upper magnetic conductor (7); wherein above the second lower magnetic conductor (13) is a second annular radial permanent magnet B (14); wherein above the second annular radial permanent magnet B (14) is the lower magnetic conduction plate (11); wherein above the lower magnetic conduction plate (11) is the first annular axial permanent magnet (12); wherein above the first annular axial permanent magnet (12) is the annular third upper magnetic conductor (6); wherein an outer magnetic gap (15) is formed between the annular third upper magnetic conductor (6) and the annular second upper magnetic conductor (5); wherein the outer voice coil (1) works in the outer magnetic gap (15); wherein an inner magnetic gap (16) is formed between the first upper magnetic conductor (7) and the annular second upper magnetic conductor (5); wherein the inner voice coil (2) works in the inner magnetic gap (16); wherein the annular third upper magnetic conductor (6) and the second lower magnetic conductor (13) are the same magnetic polarity; wherein the first annular axial permanent magnet (12) and the second annular radial permanent magnet B (14) form a closed magnetic circuit in the outer magnetic gap (15) and inner magnetic gap (16) through the first upper magnetic conductor (7), the annular second upper magnetic conductor (5), the annular third upper magnetic conductor (6), the lower magnetic conduction plate (11) and the second lower magnetic conductor (13); wherein the fin groove (8) corresponding to the fin (3) is provided on the second upper magnetic conductor (5).

5. The loudspeaker with a fin-reinforced voice coil structure according to claim 2, wherein the first upper magnetic conductor (7) is arranged in the center of a magnetic conductive bowl (17); wherein an annular radial permanent magnet C (18) is provided in the magnetic conductive bowl (17); wherein the inner diameter of the annular radial permanent magnet C (18) is greater than the maximum outer diameter of the first upper magnetic conductor (7); wherein the outer diameter of the annular radial permanent magnet C (18) is smaller than the inner diameter of the magnetic conductive bowl (17); wherein the annular second upper magnetic conductor (5) is arranged above the annular radial permanent magnet C (18); wherein an outer magnetic gap (15) is formed between the annular second upper magnetic conductor (5) and the annular third upper magnetic conductor (6) on the magnetic conductive bowl (17); wherein the outer voice coil (1) works in the outer magnetic gap (15); wherein an inner magnetic gap (16) is formed between the annular second upper magnetic conductor (5) and the first upper magnetic conductor (7); wherein the inner voice coil (2) works in the inner magnetic gap (16); wherein the annular radial permanent magnet C (18) is magnetized in the axial direction, forming a closed magnetic circuit in the outer magnetic gap (15) and inner magnetic gap (16) through the magnetic conductive bowl (17), the first upper magnetic conductor (7) and the annular second upper magnetic conductor (5); wherein the fin groove (8) corresponding to the fin (3) is provided on the second upper magnetic conductor (5); wherein the outer ring of the magnetic conductive bowl (17) is replaced with an annular radial permanent magnet D (19); wherein as a replacement, a cylindrical radial permanent magnet E (20) is provided between the first upper magnetic conductor (7) and the bottom of the magnetic conductive bowl (17); the annular radial permanent magnet D (19), the cylindrical radial permanent magnet E (20) and the annular radial permanent magnet C (18) are magnetized in reverse, and the three permanent magnets form a series relationship; the outer magnetic gap (15) and the inner magnetic gap (16) obtain high magnetic flux density.

6. The loudspeaker with a fin-reinforced voice coil structure according to claim 2, wherein the first upper magnetic conductor (7) is the center, and the top inner magnetic gap (16) is formed between the first upper magnetic conductor (7) and the annular second upper magnetic conductor (5); wherein the top outer magnetic gap (15) is formed between the annular second upper magnetic conductor (5) and the third upper magnetic conductor (6); wherein below the first upper magnetic conductor (7) are, in turn, the cylindrical radial permanent magnets E (20), and a first lower magnetic conductor (23); wherein below the annular second upper magnetic conductor (5) are, in turn, the annular radial permanent magnet C (18), and a second lower magnetic conductor (22); wherein below the annular third upper magnetic conductor (6) are, in turn, the annular radial permanent magnet D (19), the annular third lower magnetic conductor (21); wherein a bottom inner magnetic gap (25) is formed between the first lower magnetic conductor (23) and the annular second lower magnetic conductor (22); wherein the bottom inner magnetic gap (25) and the top inner magnetic gap (16) are integrally connected; wherein the inner voice coil (2) extends from the top inner magnetic gap (16) to the bottom inner magnetic gap (25); on the inner voice coil (2), a conductive coil of the top inner voice coil (28) and a conductive coil of the bottom inner voice coil (30) are respectively wound at the top inner magnetic gap (16) and the bottom inner magnetic gap (25); wherein a bottom outer magnetic gap (25) is formed between the second lower magnetic conductor (22) and the annular third lower magnetic conductor (21); wherein the bottom outer magnetic gap (24) and the top outer magnetic gap (15) are integrally connected; wherein the outer voice coil (1) extends from the top outer magnetic gap (15) to the bottom outer magnetic gap (24); wherein a conductive coil of the top outer voice coil (27) and a conductive coil of the bottom outer voice coil are respectively wound at the corresponding top outer magnetic gap (15) and the bottom outer magnetic gap (24); wherein the outer voice coil (1) and the inner voice coil (2) are connected by the top fin (3) passing through the second upper magnetic conductor (5) and the bottom fin (26) through the annular second lower magnetic conductor (22); wherein the annular second upper magnetic conductor (5) is provided with a fin groove corresponding to the top fin (3); wherein the annular second lower magnetic conductor (22) is provided with a fin groove corresponding to the bottom fin (26); wherein the annular radial permanent magnet D (19) and the cylindrical radial permanent magnet E (20) are magnetized in the same direction; wherein the magnetizing direction of the annular radial permanent magnet C (18) is opposite to that of the annular radial permanent magnet D (19) and the cylindrical radial permanent magnet E (20); wherein through the six magnetic conductor of the first upper magnetic conductor (7), the annular second upper magnetic conductor (5), the annular third upper magnetic conductor (6), the first lower magnetic conductor (23), the annular second lower magnetic conductor (22) and the annular third lower magnetic conductor (21), the three permanent magnets of the annular radial permanent magnet C (18), annular radial permanent magnet D (19) and the cylindrical radial permanent magnet E (20) form a closed magnetic circuit in the four positions of the top inner magnetic gap (16), the top outer magnetic gap (15), the bottom outer magnetic gap (24) and the bottom inner magnetic gap (25).

7. The loudspeaker with a fin-reinforced voice coil structure according to claim 2, wherein the first upper magnetic conductor (7) is arranged in the center of the magnetic conductive bowl (17); wherein an annular radial permanent magnet F (32) is provided between the first upper magnetic conductor (7) and the third upper magnetic conductor (6) in the magnetic conductive bowl (17); the annular radial permanent magnet F (32) is connected and fixed to the bottom of the magnetic conductive bowl (17) through a non-magnetic conductive gasket (31); wherein the outer magnetic gap (15) is formed between the annular radial permanent magnet F (32) and the third upper magnetic conductor (6); wherein the outer voice coil (1) is arranged in the outer magnetic gap (15); wherein the inner magnetic gap (16) is formed between the annular radial permanent magnet F (32) and the first upper magnetic conductor (7); wherein the inner voice coil (2) works in the inner magnetic gap (16); wherein magnetized radially, the annular radial permanent magnet F (32) forms a closed magnetic circuit in the inner magnetic gap (16) and the top outer magnetic gap (15) with the first upper magnetic conductor (7) and the third upper magnetic conductor (6); wherein the fin groove (8) corresponding to the fin (3) is provided on the annular radial permanent magnet F (32).

8. The loudspeaker with a fin-reinforced voice coil structure according to claim 2, wherein the voice coil is a direct conductive coil without a skeleton; wherein the fins (3) are directly fixed and connected to the conductive coil.

9. The loudspeaker with a fin-reinforced voice coil structure according to claim 1, wherein there are at least two fins (3); wherein the fins (3) intersect each other and connect to the center point of the magnetic conduction column (7).

10. The loudspeaker with a fin-reinforced voice coil structure according to claim 1, wherein there are at least two fins (3); wherein parts of the fins (3) intersect each other and connect to the center point of the magnetic conduction column (7), and the height of the intersecting part is smaller than that of the voice coil in the radial direction; intersecting each other and connecting to the center point of the magnetic conduction column (7), the fins (3) extend upward to the same height as the voice coil (34) and do not intersect each other.

* * * * *